(12) United States Patent
Fujito

(10) Patent No.: US 10,727,037 B2
(45) Date of Patent: Jul. 28, 2020

(54) MASS SPECTROMETER

(71) Applicant: SHIMADZU CORPORATION, Kyoto-shi, Kyoto (JP)

(72) Inventor: Yuka Fujito, Kyoto (JP)

(73) Assignee: SHIMADZU CORPORATION, Kyoto-shi, Kyoto (JP)

( * ) Notice: Subject to any disclaimer, the term of this patent is extended or adjusted under 35 U.S.C. 154(b) by 0 days.

(21) Appl. No.: 15/902,390

(22) Filed: Feb. 22, 2018

(65) Prior Publication Data
US 2018/0240660 A1    Aug. 23, 2018

(30) Foreign Application Priority Data

Feb. 23, 2017   (JP) ................. 2017-032441

(51) Int. Cl.
*H01J 49/26*    (2006.01)
*H01J 49/00*    (2006.01)
(Continued)

(52) U.S. Cl.
CPC .......... *H01J 49/0077* (2013.01); *G01N 30/72* (2013.01); *H01J 49/00* (2013.01); *H01J 49/025* (2013.01)

(58) Field of Classification Search
CPC ... H01J 49/0045; H01J 49/0077; G01N 30/72
See application file for complete search history.

(56) References Cited

U.S. PATENT DOCUMENTS

2009/0008542 A1    1/2009   Sumiyoshi
2014/0014833 A1    1/2014   Sekiya
(Continued)

FOREIGN PATENT DOCUMENTS

JP    2011-141220 A    7/2011

OTHER PUBLICATIONS

Yasuo Uchida et al: "Quantitative targeted absolute proteomics of rat blood-cerebrospinal fluid barrier transporters: comparison with a human specimen", Journal of Neurochemistry, vol. 134, No. 6, May 7, 2015 (May 7, 2015), pp. 1104-1115, XP055493742, New York, NY, US, ISSN: 0022-3042, 001: 10.1111 /jnc.13147 (12 pages total).

(Continued)

*Primary Examiner* — Eliza W Osenbaugh-Stewart
(74) *Attorney, Agent, or Firm* — Sughrue Mion, PLLC

(57) ABSTRACT

A mass spectrometer for performing a selected ion monitoring (SIM) measurement and/or multiple reaction monitoring (MRM) measurement on each of one or a plurality of target components contained in a sample under one or a plurality of measurement conditions is provided. The mass spectrometer includes: a storage section 41 in which SIM measurement conditions and/or MRM measurement conditions are previously stored for a plurality of components; a measurement condition selection receiver 43 for performing the following operations when a command to create a method file in which measurement conditions are described is issued by a user: reading the selected ion monitoring measurement conditions and/or multiple reaction monitoring measurement conditions of the plurality of components, displaying the measurement conditions on a screen, and receiving a selection by the user; and a method file creator 48 for creating a method file in which a measurement condition selected by the user is described.

6 Claims, 4 Drawing Sheets

| Target Component | Event | Channel | m/z | Segment of Time for Execution (min.) | Dwell Time (msec.) |
|---|---|---|---|---|---|
| Component A | 1 | 1 | A1>a1 | 2.0-5.0 | 5 |
| Component A | 1 | 2 | A2>a2 | 2.0-5.0 | 5 |
| Component B | 2 | 1 | B1>b1 | 15.0-20.0 | 5 |
| Component B | 2 | 2 | B2>b2 | 15.0-20.0 | 5 |
| Component B | 2 | 3 | B3>b3 | 15.0-20.0 | 5 |
| Component B | 2 | 4 | B4>b4 | 15.0-20.0 | 5 |
| Component C | 3 | 1 | C1>c1 | 3.5-6.5 | 5 |
| Component C | 3 | 2 | C2>c2 | 3.5-6.5 | 5 |
| Component C | 3 | 2 | C3>c3 | 3.5-6.5 | 5 |
| Component D | 4 | 1 | D1>d1 | 10.0-12.0 | 5 |
| Component D | 4 | 2 | D2>d2 | 10.0-12.0 | 5 |
| Component D | 4 | 3 | D3>d3 | 10.0-12.0 | 5 |
| ... | ... | ... | ... | ... | ... |

(51) Int. Cl.
*H01J 49/02* (2006.01)
*G01N 30/72* (2006.01)

(56) References Cited

U.S. PATENT DOCUMENTS

2015/0102219 A1 4/2015 Yamamoto
2015/0247829 A1* 9/2015 Sumiyoshi ......... G01N 30/8651
250/288

OTHER PUBLICATIONS

Yasuo Uchida et al: "Supporting information: Quantitative targeted absolute proteomics of rat blood-cerebrospinal fluid barrier transporters: comparison with a human specimen", Journal of Neurochemistry, vol. 134, May 7, 2015 (May 7, 2015), pp. 1-14, XP055493752,001: 10.1111/jnc.13147 Retrieved from the Internet:(URL:https://onlinelibrary.wiley.com/action/downloadSupplement?doi=1 0.1111/jnc.13147&file=jnc13147-sup-0001-TableS1-S2.pdf) (14 pages total).

Ken Ohmine et al: "Attenuation of Phosphorylation by Deoxycytidine Kinase is Key to Acquired Gemcitabine Resistance in a Pancreatic Cancer Cell Line: Targeted Proteomic and Metabolomic Analyses in PK9 Cells", Pharmaceutical Research, Kluwer Academic Publishers—Plenum Publishers, NL, vol. 29, No. 7, Mar. 15, 2012 (Mar. 15, 2012), pp. 2006-2016, XP035067713, ISSN: 1573-904X, DOI: 10.1007/S11095-012-0728-2 (11 pages total).

Ken Ohmine et al: "Supplementary material: Attenuation of Phosphorylation by Deoxycytidine Kinase is Key to Acquired Gemcitabine Resistance in a Pancreatic Cancer Cell Line: Targeted Proteomic and Metabolomic Analyses in PK9 Cells", Pharmaceutical Research, vol. 29, No. 7, Mar. 15, 2012 (Mar. 15, 2012), pp. 2006-2016, XP055493762, ISSN: 0724-8741, DOI: 10.1 007/s11095-012-0728-2 (7 pages total).

Extended European Search Report dated Jul. 27, 2018 issued by the European Patent Office in counterpart European application No. 18158127.3.

* cited by examiner

Fig. 1

| Target Component | Event | Channel | m/z | Segment of Time for Execution (min.) | Dwell Time (msec.) |
|---|---|---|---|---|---|
| Component A | 1 | 1 | A1>a1 | 2.0-5.0 | 5 |
| Component A | 1 | 2 | A2>a2 | 2.0-5.0 | 5 |
| Component B | 2 | 1 | B1>b1 | 15.0-20.0 | 5 |
| Component B | 2 | 2 | B2>b2 | 15.0-20.0 | 5 |
| Component B | 2 | 3 | B3>b3 | 15.0-20.0 | 5 |
| Component B | 2 | 4 | B4>b4 | 15.0-20.0 | 5 |
| Component C | 3 | 1 | C1>c1 | 3.5-6.5 | 5 |
| Component C | 3 | 2 | C2>c2 | 3.5-6.5 | 5 |
| Component C | 3 | 2 | C3>c3 | 3.5-6.5 | 5 |
| Component D | 4 | 1 | D1>d1 | 10.0-12.0 | 5 |
| Component D | 4 | 2 | D2>d2 | 10.0-12.0 | 5 |
| Component D | 4 | 3 | D3>d3 | 10.0-12.0 | 5 |
| ... | ... | ... | ... | ... | ... |

Fig. 3

| Property | Component | Channel | Type | m/z | Segment of Time for Execution (min.) | Dwell Time (msec.) |
|---|---|---|---|---|---|---|
| Agricultural Chemical | Component A | 1 | MRM | A1>a1 | 2.0-5.0 | 5 |
| Agricultural Chemical | Component A | 2 | MRM | A2>a2 | 2.0-5.0 | 5 |
| Agricultural Chemical | Component B | 1 | MRM | B1>b1 | 15.0-20.0 | 5 |
| Agricultural Chemical | Component B | 2 | MRM | B2>b2 | 15.0-20.0 | 5 |
| Agricultural Chemical | Component B | 3 | MRM | B3>b3 | 15.0-20.0 | 5 |
| Agricultural Chemical | Component B | 4 | MRM | B4>b4 | 15.0-20.0 | 5 |
| Agricultural Chemical | Component C | 1 | MRM | C1>c1 | 3.5-6.5 | 5 |
| Agricultural Chemical | Component C | 2 | MRM | C2>c2 | 3.5-6.5 | 5 |
| Agricultural Chemical | Component C | 2 | MRM | C3>c3 | 3.5-6.5 | 5 |
| Agricultural Chemical | Component D | 1 | MRM | D1>d1 | 10.0-12.0 | 5 |
| Agricultural Chemical | Component E | 1 | MRM | E1>e1 | 13.0-15.0 | 5 |
| Agricultural Chemical | Component E | 2 | MRM | E2>e2 | 13.0-15.0 | 5 |
| ... | ... | ... | ... | ... | ... | ... |
| Drug | Component 1 | 1 | MRM | A1>a1 | 2.0-5.0 | 5 |
| Drug | Component 1 | 2 | MRM | A2>a2 | 2.0-5.0 | 5 |
| Drug | Component 1 | 3 | MRM | B1>b1 | 15.0-20.0 | 5 |
| Drug | Component 2 | 1 | MRM | B2>b2 | 15.0-20.0 | 5 |
| Drug | Component 2 | 2 | MRM | B3>b3 | 15.0-20.0 | 5 |
| Drug | Component 2 | 3 | MRM | B4>b4 | 15.0-20.0 | 5 |
| ... | ... | ... | ... | ... | ... | ... |

Fig. 4

Event

| Property | Selection | Component | Event | Segment of Time for Execution (min.) | Dwell Time (msec.) |
|---|---|---|---|---|---|
| Agricultral Chemical |  | Component A | 1 | 2.0-5.0 | 5 |
| Agricultral Chemical | ✓ | Component B | 2 | 15.0-20.0 | 5 |
| Agricultral Chemical |  | Component C | 3 | 3.5-6.5 | 5 |
| Agricultral Chemical |  | Component D | 4 | 10.0-12.0 | 5 |
| Agricultral Chemical | ✓ | Component E | 5 | 13.0-15.0 | 5 |
| Agricultral Chemical |  | ... | ... | ... | ... |

Channel

| Channel | Selection | Type | m/z | Segment of Time for Execution (min.) | Dwell Time (msec.) |
|---|---|---|---|---|---|
| 1 | ✓ | MRM | B1>b1 | 15.0-20.0 | 5 |
| 2 | ✓ | MRM | B2>b2 | 15.0-20.0 | 5 |
| 3 | ✓ | MRM | B3>b3 | 15.0-20.0 | 5 |
| 4 |  | MRM | B4>b4 | 15.0-20.0 | 5 |

OK    Cancel

Fig. 5A

| | | | | | | |
|---|---|---|---|---|---|---|
| | | | | Maximum Loop Time: 150ms | | |
| Segment | 1 | 2 | 3 | ... | 15 | ... |
| Beginning time (min.) | 0.143- | 0.323- | 0.359- | ... | 10.51- | ... |
| Channel number | 1 | 2 | 3 | ... | 20 | ... |
| Loop time (msec) | 5.0 | 10.0 | 15.0 | ... | 100.0 | ... |
| Dwell time (msec) | 5.0 | 5.0 | 5.0 | ... | 5.0 | ... |

OK   Cancel

Fig. 5B

Maximum Loop Time: 150ms

Please check the loop time in Segment 15.

| Segment | 1 | 2 | 3 | ... | 15 | ... |
|---|---|---|---|---|---|---|
| Beginning time (min.) | 0.143- | 0.323- | 0.359- | ... | 10.51- | ... |
| Channel number | 1 | 2 | 3 | ... | 20 | ... |
| Loop time (sec) | 5.0 | 10.0 | 15.0 | ... | 175.0 | ... |
| Dwell time (msec) | 5.0 | 5.0 | 5.0 | ... | 5.0 / 20.0 | ... |

OK   Re-Selection   Cancel

MASS SPECTROMETER

TECHNICAL FIELD

The present invention relates to a mass spectrometer for performing a selected ion monitoring measurement and/or multiple reaction monitoring measurement of a known kind of target component contained in a sample.

BACKGROUND ART

A technique called the "MS/MS analysis (tandem analysis)" is known as a mass spectrometric technique used for a qualitative and/or quantitative determination of a known kind of component contained in a sample. For example, the MS/MS analysis is performed using a mass spectrometer (such as a tandem quadrupole mass spectrometer) having a front mass separator section for selecting a precursor ion, a fragmenting section, such as a collision cell, for fragmenting the precursor ion into product ions, and a rear mass separator section for selecting a product ion.

A multiple reaction monitoring (MRM) measurement is one of the measurement methods in the MS/MS analysis. In an MRM measurement, the mass-to-charge ratio at which an ion is allowed to pass through is fixed in each of the front and rear mass separator sections to measure the intensity of a specific product ion generated from a specific precursor ion. This combination of the precursor ion and the product ion is called the "MRM transition". In the MRM measurement, the front and rear mass separator sections remove ions originating from components which are not the target of the measurement, ions originating from foreign components, as well as neutral particles which have not been ionized. Therefore, ion intensity signals with a high signal-to-noise (SN) ratio can be obtained even in a simultaneous analysis of a sample containing a plurality of target components or an analysis of a sample containing a considerable amount of foreign components.

Due to such merits, the MRM measurement has been used for an analysis of a sample which contains a plurality of known kinds of target components, as in the testing of agricultural chemicals contained in food samples or the testing of drugs contained in biological metabolites. For such a simultaneous analysis of multiple components, a chromatograph mass spectrometer including a chromatograph (gas chromatograph or liquid chromatograph) combined with a mass spectrometer having the previously described configuration is used. The plurality of target components contained in a sample are temporally separated by a column in the chromatograph and introduced into the mass spectrometer, to be individually subjected to the MRM measurement.

To perform an MRM measurement by a chromatograph mass spectrometer, one or more MRM measurement conditions should be previously determined for each of the plurality of target components. MRM measurement conditions include the MRM measurement time segment during which the measurement should be performed, and the MRM transition to be used in the measurement. Each MRM measurement time segment is determined so that it includes the retention time of the target component to be subjected to the measurement. The MRM transition is determined, for example, by referring to a database.

One or more MRM measurements performed for one target component are handled as one set called the "event". The individual MRM measurements are called "channels".

CITATION LIST

Patent Literature

Patent Literature 1: JP 2011-141220 A

SUMMARY OF INVENTION

Technical Problem

In an MRM measurement, tens or hundreds of target components are normally subjected to the measurement for each sample, with a plurality of MRM transitions used for each target component in the measurement. To perform an MRM measurement, a method file as shown in FIG. 1 should be prepared beforehand. A method file contains a description of measurement parameters, such as the mass-to-charge ratios of the ions to be monitored in one or more MRM measurements performed for each target component, the segment of time for execution of each MRM measurement, and the period of time for each single execution of the MRM measurement (dwell time).

In the case of performing an MRM measurement for hundreds of target components, a considerable amount of time and labor will be required if a user creates a method file from scratch for each measurement by preparing events and channels as well as entering all of those measurement conditions. Furthermore, in the aforementioned case of testing agricultural chemicals or drugs, it is often the case that there are many target components common to the MRM measurements. Accordingly, when an MRM measurement is performed, a method file used in a past MRM measurement which has many common events and channels with the MRM measurement being planned is read, and a method file for the new MRM measurement is created by deleting unnecessary events and channels from the old method file while adding necessary events and channels as well as entering their measurement conditions.

However, the task of deleting and/or adding events and channels in the previously described manner for every MRM measurement still requires time and labor. Furthermore, the measurement conditions may be incorrectly entered when a new event or channel is added.

Although the description thus far has been concerned with the MRM measurement, similar problems also exist in the case of a selected ion monitoring (SIM) measurement as well as in the case of performing both the SIM measurement and the MRM measurement. Furthermore, although the previous description was concerned with the case of using a chromatograph mass spectrometer, similar problems also exist in a mass spectrometer which performs a measurement without separating the target components in the sample by a column of a chromatograph (e.g. which employs a flow injection method for the introduction of the sample).

The problem to be solved by the present invention is to provide a mass spectrometer used for performing an SIM measurement and/or MRM measurement which is capable of easily and correctly creating a method file in which measurement conditions are described for each target component.

Solution to Problem

The present invention developed for solving the previously described problem is a mass spectrometer for performing a selected ion monitoring measurement and/or a multiple reaction monitoring measurement on each of one or a plurality of target components contained in a sample under one or a plurality of measurement conditions, the mass spectrometer including:

a) a storage section in which a selected ion monitoring measurement condition and/or a multiple reaction monitoring measurement condition is previously stored for each of a plurality of components;

b) a measurement condition selection receiver for performing following operations when a command to create a method file in which measurement conditions are described is issued by a user: reading the selected ion monitoring measurement conditions and/or multiple reaction monitoring measurement conditions of the plurality of components, displaying the measurement conditions on a screen, and receiving a selection by the user;

c) a method file creator for creating a method file in which a measurement condition selected by the user is described.

For example, the measurement conditions in the selected ion monitoring measurement and/or multiple reaction monitoring measurement include the mass-to-charge ratio of an ion to be monitored and a piece of information related to the period of time for each single execution of the measurement concerned. The measurement condition selection receiver can be configured, for example, to display a list of measurement conditions along with checkboxes and receive a selection through an input in those checkboxes (by the checking of a desired checkbox by the mouse-clicking operation). It may also be configured to receive a selection by allowing the user to change the display color of a desired measurement condition by a clicking operation.

In the mass spectrometer according to the present invention, selected ion monitoring (SIM) measurement conditions and/or multiple reaction monitoring (MRM) measurement conditions to be used for an SIM measurement and/or MRM measurement are previously stored for each of the components in the storage section. When a command to create a method file is issued by a user, the measurement conditions written in a library are read from the storage section and listed on the screen. The measurement condition selection receiver displays, for example, the checkboxes mentioned earlier and receives a user input for the selection of a measurement condition through those checkboxes. After the measurement conditions to be used in the SIM measurements or MRM measurements have been selected by the user, the method file creator creates a method file in which the measurement conditions selected by the user are described. Thus, the mass spectrometer according to the present invention does not require the user to manually delete or enter measurement conditions, so that the user can easily yet correctly create a method file. The device may also be configured to allow the user to appropriately change the order of description of the measurement conditions in the method file if the user has selected a plurality of measurement conditions.

The mass spectrometer according to the present invention may preferably be configured as follows:

the plurality of components are categorized by a property of the components;

the mass spectrometer further includes:

d) a property selector for allowing a user to select the property; and according to a selection of the property by a user, the measurement condition selection receiver displays, on the measurement condition selection receiver, the selected ion monitoring measurement condition and/or multiple reaction monitoring measurement condition for a component corresponding to the selected property.

As the property, for example, the category of the sample may be used, such as the agricultural chemical, drug, sample of biological origin, or sample of environmental origin. In the previously described mode of the mass spectrometer, only the selected ion monitoring measurement conditions and/or multiple reaction monitoring measurement conditions for the components corresponding to the property selected by the user are displayed on the list. The number of measurement conditions to be considered for selection by the user is thereby decreased, and the user can more efficiently create the method file.

In a simultaneous analysis of multiple components in which the measurement needs to be performed for tens or hundreds of target components, the target components contained in a sample are temporally separated by a column of a chromatograph, and the SIM measurement or MRM measurement for each target component is performed at the point in time where the target component concerned is eluted from the column (retention time). If there is a large number of target components, the time segments of a plurality of SIM measurements or those of the MRM measurements may overlap each other. In such a case, an operation is repeated in which the plurality of channels which are set within the overlapping segment of time are sequentially and individually executed, with a predetermined period of time allotted to each channel. The period of time for each single execution of one channel is called the "dwell time". The total period of time required for the plurality of channels within the same segment of time, with each channel executed only once, is called the "loop time". The greater the number of overlapping segments of time for execution in the measurement conditions selected by the user is, the longer the loop time becomes. The loop time can also be interpreted as the interval of time at which a series of data are obtained in each channel. If this interval of time is excessively long, the number of measurement points forming a peak on a chromatogram will be insufficient, and the reproducibility of the peak on a mass chromatogram will deteriorate, making it impossible to correctly analyze the target component.

Accordingly, in the case where the mass spectrometer according to the present invention is a chromatograph mass spectrometer provided with a chromatograph including a column for temporally separating a plurality of target components contained in a sample, it is preferable that:

the selected ion monitoring measurement conditions and/or multiple reaction monitoring measurement conditions include a segment of time for execution of the measurement concerned and a dwell time which is a period of time for each single execution of the measurement concerned, and the mass spectrometer includes:

e) a measurement time divider for dividing, based on the measurement conditions selected by the user, the entire measurement time from the beginning to the end of the measurement of a sample into a plurality of partial segments of time each of which is assigned a different set of selected ion monitoring measurements and/or multiple reaction monitoring measurements to be performed within the same segment of time;

f) a loop time calculator for calculating a loop time which is the total of the dwell times of the selected ion monitoring measurements and/or multiple reaction monitoring measurements performed within each of the plurality of partial segments of time; and g) a loop time presenter for presenting the calculated loop time to a user.

The previously described configuration in which the loop time is calculated for each of the plurality of partial segments of time and is presented to a user allows the user to check the presented loop times and appropriately change the selection of the measurement conditions or the dwell time so as to prevent the loop time from being excessively long. The deterioration of the reproducibility of the peak on a mass chromatogram due to an excessively long loop time is thereby prevented, so that the target components can always be correctly analyzed.

The chromatograph mass spectrometer provided with the loop time calculator may preferably further include:

h) a resetting presenter for urging a user to change the content of the selection of the selected ion monitoring measurement conditions and/or multiple reaction monitoring measurement conditions of the plurality of components, or to change the measurement conditions, when the loop time calculated by the loop time calculator is longer than a predetermined maximum loop time.

In the previously described mode of the chromatograph mass spectrometer provided with the resetting presenter, when the calculated loop time is longer than the maximum loop time, the user is urged to change the input, whereby the deterioration of the reproducibility of the peak on a chromatogram due to an excessively long loop time is assuredly prevented.

Advantageous Effects of the Invention

With the mass spectrometer according to the present invention, a method file in which measurement conditions are described for each target component can be easily and correctly created for SIM measurements and/or MRM measurements to be performed.

BRIEF DESCRIPTION OF DRAWINGS

FIG. 1 is one example of the method file used in an MRM measurement.

FIG. 3 is one example of the library used in the present embodiment.

FIG. 4 is an example of the screen displayed by the measurement condition selection receiver.

FIGS. 5A and 5B are examples of the screen for displaying segment information which is created based on measurement conditions selected by a user.

DESCRIPTION OF EMBODIMENTS

Figure 2:
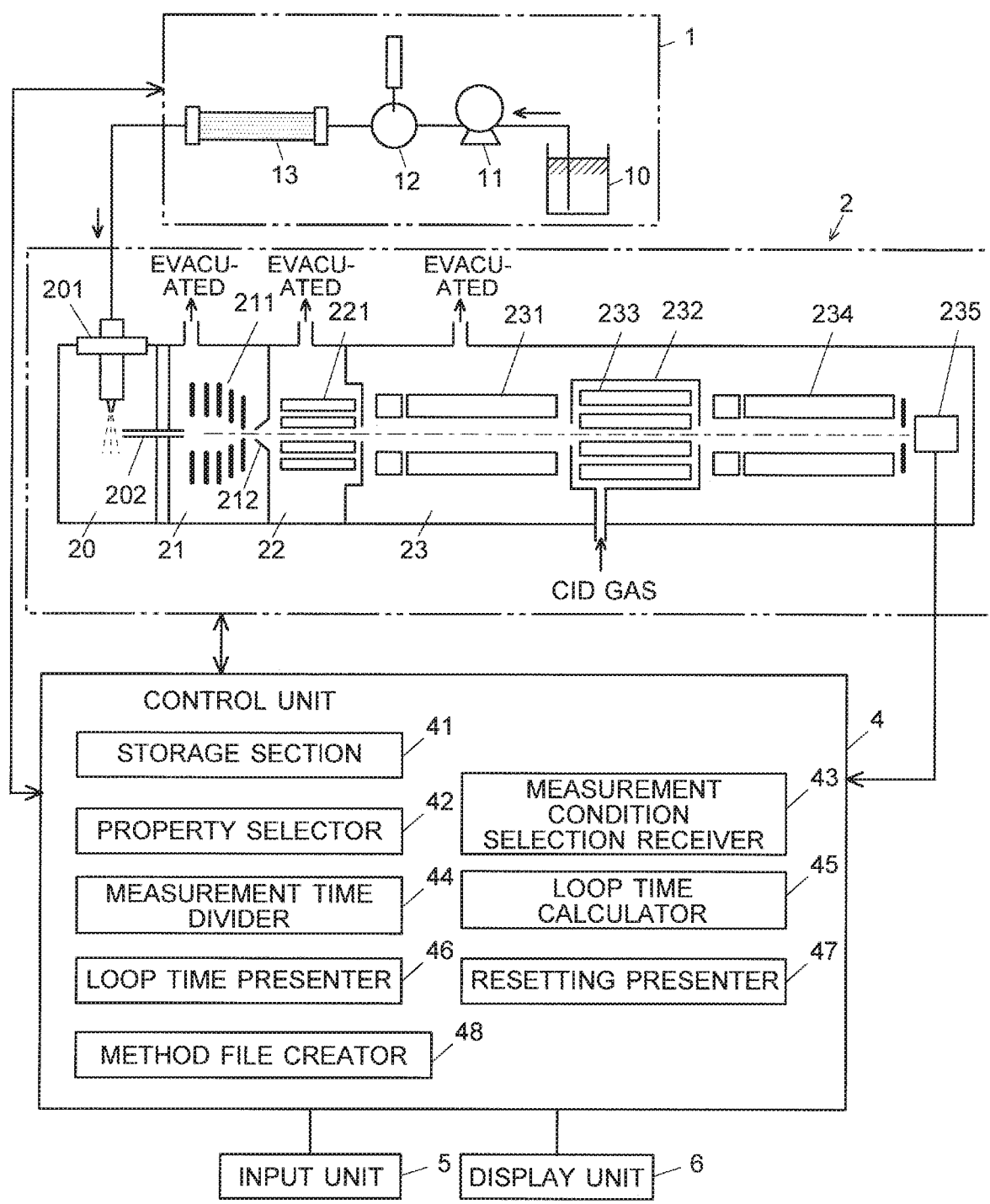
FIG. 2 is a configuration diagram of the main components of a chromatograph mass spectrometer as one embodiment of the mass spectrometer according to the present invention.

A chromatograph mass spectrometer as one embodiment of the mass spectrometer according to the present invention is hereinafter described with reference to the drawings. FIG. 2 is a configuration diagram of the main components of the chromatograph mass spectrometer in the present embodiment.

The chromatograph mass spectrometer in the present embodiment is a liquid chromatograph mass spectrometer composed of a liquid chromatograph unit 1, mass spectrometer unit 2, and control unit 4 for controlling the operations of those units.

In the liquid chromatograph mass spectrometer in the first embodiment, the liquid chromatograph unit 1 includes a mobile phase container 10 in which a mobile phase is stored, a pump 11 for drawing the mobile phase and supplying it at a fixed flow rate, an injector 12 for injecting a predetermined amount of sample liquid into the mobile phase, and a column 13 for temporally separating various compounds contained in the sample liquid.

The mass spectrometer unit 2 has the configuration of a multi-stage differential pumping system including an ionization chamber 20 maintained at approximately atmospheric pressure and an analysis chamber 23 evacuated to a high degree of vacuum by a vacuum pump (not shown), between which first and second intermediate vacuum chambers 21 and 22 are provided having their degrees of vacuum increased in a stepwise manner. The ionization chamber 20 is provided with an electrospray ionization probe (ESI probe) 201 for spraying a sample solution while imparting electric charges to the same solution. The ionization chamber 20 communicates with the first intermediate vacuum chamber 21 in the next stage via a thin heated capillary 202. The first intermediate vacuum chamber 21 is separated from the second intermediate vacuum chamber 22 by a skimmer 212 having a small hole at its apex. The first and second intermediate vacuum chambers 21 and 22 respectively contain ion guides 211 and 221 for transporting ions to the next stage while converging the ions. The analysis chamber 23 contains a front quadrupole mass filter (Q1) 231 which separates ions according to their mass-to-charge ratios and a rear quadrupole mass filter (Q3) 234 which also separates ions according to their mass-to-charge ratios, with a collision cell 232 containing a multipole ion guide (q2) 233 placed between the two mass filters, as well as an ion detector 235.

A CID gas, such as argon or nitrogen, is appropriately supplied into the collision cell 232. In each of the quadrupole mass filters 231 and 234, pre-rod electrodes for correcting the disturbance of the electric field at the inlet end are provided before the main rod electrodes. A voltage which is different from those applied to the main rod electrodes can be applied to the pre-rod electrodes.

The mass spectrometer unit 2 can perform various measurements, such as a selected ion monitoring (SIM) measurement, MS/MS scan measurement (product-ion scan measurement), and multiple reaction monitoring (MRM) measurement. In the SIM measurement, no selection of an ion is performed in the front quadrupole mass filter (Q1) 231 (i.e. this mass filter is disabled from functioning), while the rear quadrupole mass filter (Q3) 234 is operated to allow ions to pass through this filter only at a fixed mass-to-charge ratio and be detected.

On the other hand, in the MS/MS scan measurement (product ion scan measurement) and MRM measurement, the front quadrupole mass filter (Q1) 231 and rear quadrupole mass filter (Q3) 234 are both made to function as the mass filters. The front quadrupole mass filter (Q1) 231 allows only an ion designated as the precursor ion to pass through. Additionally, the CID gas is supplied into the collision cell 232 to fragment the precursor ion into product ions. In the MS/MS scan measurement, the mass-to-charge ratio of the ion to be allowed to pass through the rear quadrupole mass filter (Q3) 234 is continuously changed. In the MRM measurement, the mass-to-charge ratio of the ion to be allowed to pass through the rear quadrupole mass filter (Q3) 234 is fixed.

The control unit 4 has a storage section 41 and the following functional blocks: a property selector 42, measurement condition selection receiver 43, measurement time divider 44, loop time calculator 45, loop time presenter 46, resetting presenter 47 and method file creator 48. The same unit also has other functions, such as the control of the operations of relevant elements in the liquid chromatograph unit 1 and the mass spectrometer unit 2, as well as the application of predetermined voltages from a voltage-applying unit (not shown) to relevant elements in the mass spectrometer unit 2. The control unit 4 is actually a personal computer. A program for mass spectrometric measurements previously installed on this computer is executed to make this computer function as the aforementioned components. Additionally, an input unit 6 and display unit 7 are connected to the control unit 4.

The storage section 41 holds one or more SIM measurement conditions and/or MRM measurement conditions prepared beforehand for each of the plurality of components. The information related to the individual components is grouped by the property (agricultural chemical, drug, and so on) of each component. This set of information is hereinafter called the "library". Additionally, in the following description, the SIM measurement conditions and/or MRM measurement conditions are collectively called the "measurement conditions".

FIG. 3 shows one example of the library. Although only MRM measurement conditions are shown the example of FIG. 3, a library which holds only SIM measurement conditions, or one which holds a mixture of SIM measurement conditions and MRM measurement conditions, is also possible. The components are grouped by their respective properties (agricultural chemical, drug, and so on). One or more MRM measurement conditions (mass-to-charge ratio of the precursor ion, mass-to-charge ratio of the product ion, segment of time for execution of the measurement, and dwell time) are related to each component.

The steps of determining the conditions for performing MRM measurements on a plurality of target components in a sample and creating a method file which describes those conditions in the liquid chromatograph mass spectrometer in the present embodiment are hereinafter described.

A user performs a predetermined operation, such as the execution of the program for mass spectrometry mentioned earlier, to issue a command to create a method file. Upon this operation, the property selector 42 displays a screen inquiring of the user about the property of the target components to be subjected to the measurement and urging the user to select the property of those target components. For example, this selection can be made through a pulldown menu displayed on the screen.

After the property of the target components (which is the "agricultural chemical" in the present embodiment) has been selected by the user, the measurement condition selection receiver 43 reads, from the library in the storage section 41, measurement conditions of the components categorized as agricultural chemical and displays them on the display unit 6, along with a selection field having a checkbox or similar element for receiving a selection input by the user for each measurement condition. If no property of the target components is selected by the user (e.g. if the input operation has been bypassed), the measurement condition selection receiver 43 displays the measurement conditions of all components stored in the library.

FIG. 4 is one example of the screen displayed by the measurement condition selection receiver 43. In the present embodiment, this screen is composed of an event list display area and a channel list display area. An "event" means a set of one or more SIM measurements and MRM measurements performed for one target component. A "channel" means each individual SIM measurement or MRM measurement.

The event list located in the upper section of the screen shows a list of components along with the selection fields. The user clicks the selection field of a desired component, whereupon the same selection field becomes checked, indicating that the component has been selected. When the checked selection field is once more clicked, the same field becomes unchecked, and the selection is cleared. In FIG. 4, components B and E are selected.

The channel list located in the lower section of the screen shows a list of measurement conditions of the target components selected by the user, along with the selection fields. Once again, the user clicks the selection field of a desired measurement condition, whereupon the same selection field becomes checked, indicating that the measurement condition has been selected. When the checked selection field is once more clicked, the same field is unchecked, and the selection is cleared. In FIG. 4, the measurement conditions of component B (indicated by the shaded area in the event list) are displayed, and channels 1-3 are selected.

The user presses the "OK" button on the screen to complete the selection of the target components and the measurement conditions of each target component. Then, based on the measurement conditions selected by the user, the measurement time divider 44 divides the entire measurement time from the beginning to the end of the measurement of a sample into a plurality of partial segments of time each of which is assigned a different set of SIM measurements and MRM measurements to be performed within the same segment of time. The partial segments of time are hereinafter simply called the "segments". The loop time calculator 45 calculates the loop time, i.e. the total of the dwell times of the SIM measurements and MRM measurements to be performed within each segment. The loop time presenter 46 presents the calculated loop time to the user.

If the loop time is shorter than the maximum loop time (in the present embodiment, 150 ms) in all segments, the loop time presenter 46 displays a list which shows the beginning time of each segment, number of channels to be executed in the segment, loop time in the segment, and dwell time of the channels to be executed in the segment (if there are two or more values of the dwell time, the smallest and largest values are displayed), as shown in FIG. 5A. On this screen, the user checks the outline of the series of measurements and presses the "OK" button, whereupon the method file creator 48 creates a method file in which the measurement conditions selected by the user are written. As for the maximum loop time, the user can previously set an appropriate value taking into account the device configuration and other relevant factors.

If there is a segment in which the loop time is longer than the maximum loop time, the resetting presenter 47 additionally displays an appropriate message, such as the "Check the loop time" message as shown in FIG. 5B, along with the aforementioned pieces of information displayed by the loop time presenter 46. Furthermore, a "Re-Selection" button is displayed on the screen in the present case. If the user having recognized the message wishes to once more select the measurement conditions, the user can return to the screen shown in FIG. 4 by pressing the "Re-Selection" button. Otherwise, the user may find no problem in the displayed setting and press the "OK" button, whereupon the method file creator 48 creates a method file in which the measurement conditions selected by the user are written.

In an SIM measurement or MRM measurement, a so-called "compound table" may be used in the post-measurement analysis. The information contained in the compound table includes the retention time, calibration curve and other kinds of data obtained by performing measurements on standard samples of known compounds (components) using a specific device configuration (e.g. the configurations of the column in the chromatograph, mass separator sections in the mass spectrometer, and other related components), as well as the measurement conditions and other related information used for obtaining those data. The compound table is often supplied by the manufacturer as a part of the chromatograph mass spectrometer or similar product.

The information contained in the compound table have some common items of information with the library described in the previous embodiment, such as the measurement conditions and the retention time. Accordingly, necessary items of information can be extracted from the existing compound table to prepare the library. Since there is a wide variety of components to be registered in the library, a considerable amount of time and labor will be required if the user should prepare the library from scratch. Extracting necessary items of information from an existing compound table dramatically reduces the amount of time and labor for the preparation of the library. Furthermore, the components described in the library can be previously related to the corresponding components described in the compound table so that the post-measurement analysis of data using the compound table can be more smoothly performed. The device may also be configured so that, if an item of information which is common to both the library and the compound table has been changed in one of them, the corresponding item of information in the other one will be automatically changed in the same manner.

The previous embodiment is a mere example and can be appropriately changed within the spirit of the present invention.

Although the previously described embodiment is concerned with an example of the liquid chromatograph mass spectrometer, the configuration can also be similarly applied in a gas chromatograph mass spectrometer. A similar configuration is also possible in the case of a mass spectrometer in which a sample is introduced by a flow injection or similar method without using the column of a chromatograph. Any of the screens shown in the drawings is a mere example and can be displayed in any appropriate layout on the display unit in accordance with the previous descriptions.

REFERENCE SIGNS LIST

1 . . . Liquid Chromatograph Unit
2 . . . Mass Spectrometer Unit
4 . . . Control Unit
  41 . . . Storage Section
  42 . . . Property Selector
  43 . . . Measurement Condition Selection Receiver
  44 . . . Measurement Time Divider
  45 . . . Loop Time Calculator
  46 . . . Loop Time Presenter
  47 . . . Resetting Presenter
  48 . . . Method File Creator
5 . . . Input Unit
6 . . . Display Unit

The invention claimed is:

1. A mass spectrometry method for performing a selected ion monitoring measurement and/or a multiple reaction monitoring measurement on each of one or a plurality of target components contained in a sample under one or a plurality of measurement conditions, the mass spectrometry method comprising:
  preparing a selected ion monitoring measurement condition and/or a multiple reaction monitoring measurement condition for each of a plurality of components;
  reading the selected ion monitoring measurement conditions and/or multiple reaction monitoring measurement conditions of the plurality of components when a command to create a method file in which measurement conditions are described is input;
  displaying the measurement conditions on a screen;
  receiving a selection of the measurement condition;
  creating a method file in which a selected measurement condition is described; and
  performing the selected ion monitoring measurement and/or the multiple reaction monitoring measurement,
  wherein the selected ion monitoring measurement conditions and/or the multiple reaction monitoring measurement conditions include mass to charge ratio of an ion to be measured.

2. The mass spectrometry method according to claim 1, wherein:
  the plurality of components are categorized by a property of the components; and
  the mass spectrometry method further comprises:
  displaying, on the measurement condition selection receiver, the selected ion monitoring measurement condition and/or multiple reaction monitoring measurement condition for a component corresponding to the selected property, according to a selection of the property.

3. The mass spectrometry method according to claim 2, wherein:
  the mass spectrometer is a chromatograph mass spectrometer provided with a chromatograph including a column for temporally separating a plurality of target components contained in a sample;
  the selected ion monitoring measurement conditions and/or multiple reaction monitoring measurement conditions include a segment of time for execution of the measurement concerned and a dwell time which is a period of time for each single execution of the measurement concerned;
  and the mass spectrometry method further comprises:
  dividing, based on the selected measurement conditions, an entire measurement time from a beginning to an end of the measurement of a sample into a plurality of partial segments of time each of which is assigned a different set of selected ion monitoring measurements and/or multiple reaction monitoring measurements to be performed within the same segment of time;
  calculating a loop time which is a total of the dwell times of the selected ion monitoring measurements and/or multiple reaction monitoring measurements performed within each of the plurality of partial segments of time; and
  presenting the calculated loop time.

4. The mass spectrometry method according to claim 3, further comprising:
  urging a user to change a content of the selection of the selected ion monitoring measurement conditions and/or multiple reaction monitoring measurement conditions of the plurality of components, or to change the measurement conditions, when the calculated loop time calculated is longer than a predetermined maximum loop time.

5. The mass spectrometry method according to claim 1, wherein:
  the mass spectrometry is a chromatography mass spectrometry using a chromatograph including a column for temporally separating a plurality of target components contained in a sample;

the selected ion monitoring measurement conditions and/or multiple reaction monitoring measurement conditions include a segment of time for execution of the measurement concerned and a dwell time which is a period of time for each single execution of the measurement concerned;

and the mass spectrometry method further comprises:

dividing, based on the selected measurement conditions, an entire measurement time from a beginning to an end of the measurement of a sample into a plurality of partial segments of time each of which is assigned a different set of selected ion monitoring measurements and/or multiple reaction monitoring measurements to be performed within the same segment of time;

calculating a loop time which is a total of the dwell times of the selected ion monitoring measurements and/or multiple reaction monitoring measurements performed within each of the plurality of partial segments of time; and presenting the calculated loop time.

6. The mass spectrometry method according to claim 5, further comprising:

urging a user to change a content of the selection of the selected ion monitoring measurement conditions and/or multiple reaction monitoring measurement conditions of the plurality of components, or to change the measurement conditions, when the calculated loop time is longer than a predetermined maximum loop time.

* * * * *